United States Patent [19]

Timm et al.

[11] Patent Number: 4,623,706
[45] Date of Patent: Nov. 18, 1986

[54] PROCESS FOR PREPARING UNIFORMLY SIZED POLYMER PARTICLES BY SUSPENSION POLYMERIZATION OF VIBRATORILY EXCITED MONOMERS IN A GASEOUS OR LIQUID STREAM

[75] Inventors: Edward E. Timm, Coleman; Douglas E. Leng, Midland, both of Mich.

[73] Assignee: The Dow Chemical Company, Midland, Mich.

[21] Appl. No.: 643,578

[22] Filed: Aug. 23, 1984

[51] Int. Cl.$^4$ .............................................. C08F 2/18
[52] U.S. Cl. ..................................... 526/88; 526/918; 526/920
[58] Field of Search ........................ 526/88, 918, 920

[56] References Cited

U.S. PATENT DOCUMENTS 4,487,898 12/1984 Kato et al. ............................ 526/88

FOREIGN PATENT DOCUMENTS 0051210 5/1982 European Pat. Off. ............. 526/88
3009812 9/1981 Fed. Rep. of Germany ........ 526/88
81/03659 12/1981 PCT Int'l Appl. ................... 526/88

*Primary Examiner*—Joseph L. Schofer
*Assistant Examiner*—Peter F. Kulkosky

[57] ABSTRACT

Spheroidal polymer beads having a uniform size are prepared by polymerizing uniformly sized monomer droplets formed by vibratory excitation of a laminar jet of monomeric material flowing in a gas phase. For example, a laminar jet of a monomer mixture comprising styrene, divinylbenzene and a polymerization initiator can be subjected to vibratory excitation and the resulting monomer droplets polymerized to yield copolymer beads having a narrow particle size range distribution. The copolymer beads can be employed in applications where beads having diameters of 5 $\mu$m to 100 $\mu$m are useful.

14 Claims, 3 Drawing Figures

PROCESS FOR PREPARING UNIFORMLY SIZED POLYMER PARTICLES BY SUSPENSION POLYMERIZATION OF VIBRATORILY EXCITED MONOMERS IN A GASEOUS OR LIQUID STREAM

BACKGROUND OF THE INVENTION

The present invention relates to the preparation of small spheroidal polymer beads, particularly to a method for preparing small spheroidal polymer beads having a relatively uniform particle size.

Uniformly sized polymer beads in the size range from about 5 to about 100 microns in diameter are employed in a variety of applications. Such polymer beads have been employed, for example, as calibration standards for blood cell counters, aerosol instruments, in pollution control equipment, in fast liquid protein chromatography and other chromatographic applications, as substrates for ion exchange resins, as seeds for the preparation of larger uniformly sized polymer particles, and as spacers for photographic emulsions, among other uses.

Unfortunately, however, the preparation of such uniformly sized spheroidal polymer particles using known methods is not entirely satisfactory. For example, in U.S. Pat. Nos. 4,186,120 and 4,336,173 to Ugelstad, it is taught to prepare a seed latex having oligomeric particles of low molecular weight and subsequently causing the latex particles to imbibe a material of limited water solubility. If such imbibed material is a polymerizable monomer, the monomer may be polymerized within the seed latex particle to produce uniformly sized polymer particles having diameters of up to 50 micrometers. Unfortunately, however, such process is useful only when monomers within a specific range of water solubility are employed. An additional limitation to this process is that only monomers which are amenable to an emulsion polymerization process are advantageously employed therein. Moreover, the particle size distribution is primarily controlled indirectly through the preparation of the seed latex particles. Accordingly, nonuniformly dispersed seed latex particles will give rise to product particles having a size distribution which is quite poor. Also, differences in the molecular weight or crosslinking of the polymers in the various seed latex particles as well as nonuniform imbibation of monomers thereby will give rise to nonuniformity in the sizes of the product particles.

In another known process for preparing uniform size polymer particles of about 1 to 40 micrometers, a jet of a polymer solution is vibratorily broken into droplets, and the resulting droplets are spray dried to remove the solvent therefrom. Apparatus for preparing such polymer particles according to this process are commercially available. While direct control of the size of the product particles can be exercised using this method, this method is used only for polymers which may be dissolved in some solvent. For example, this process is not useful for the preparation of uniformly sized particles of crosslinked polymers. Another problem with this method is that the aerosol generated thereby contains significant amounts of organic solvents which are evaporated from the jetted polymer solution.

Accordingly, it would be highly desirable to provide a method for preparing uniformly dispersed polymer particles having diameters in the range from about 5 to about 100 micrometers whereby the deficiencies associated with known methods can be avoided.

SUMMARY OF THE INVENTION

Accordingly, in one aspect, the present invention is a method for preparing spheroidal polymer beads. In this method, a monomer jet having laminar flow characteristics is formed by flowing a liquid monomer phase comprising a polymerizable monomer through an opening into a continuous gas phase. The monomer jet is vibratorily excited under conditions sufficient to form a plurality of monomer droplets comprising the polymerizable monomer. The monomer droplets are subsequently polymerized under conditions which do not cause significant coalescence or additional dispersion thereof. Said polymerization is effected by (a) (cationic) polymerization while said droplets are dispersed in a gas phase, or (b) dispersing said droplets into a continuous phase comprising a liquid immiscible with the polymerizable monomer or monomer phase and containing a stabilizing amount of the suspending agent and subsequently polymerizing said droplets in suspension at conditions which do not cause significant coalescence or additional dispersion thereof. Generally, polymer beads so prepared have a volume average particle diameter of about 0.5 to 100 micrometers.

In another aspect, the present invention is an apparatus for preparing spheroidal polymer beads. This apparatus comprises (1) a monomer reservoir containing a liquid monomer phase comprising a polymerizable monomer, (2) a column containing a continuous gas phase, which column surrounds (3) a monomer jet-forming means in intimate contact with the monomer phase and having an opening connecting the monomer reservoir with the column containing the continuous gas phase such that the monomer phase passing therethrough is capable of forming a jet having laminar flow characteristics, (4) a vibratory exciter capable of vibratorily exciting the laminar flow jet of the monomer phase such that the monomer jet is broken into droplets and (5) a means for polymerizing the monomer droplets under conditions such that the subsequent significant coalescence or additional disperison of monomer droplets does not occur.

Surprisingly by the practice of the present invention, exceptionally uniform monomer droplets can be formed. Upon polymerization, said uniform droplets are formed into unexpectedly uniform polymer particles. For example, spheroidal polymer beads can be prepared by the practice of the present invention having a sufficiently uniform particle size such that about 90 volume percent of the beads possess a particle diameter from about 0.95 to 1.05 times the volume average particle diameter of the particles.

The method and apparatus of the present invention are useful in the preparation of uniform sized spheroidal polymer particles from polymerizable monomers, particularly monomers which are polymerizable using gas phase cationic polymerization techniques and/or conventional suspension polymerization techniques. The method and apparatus are particularly useful in the preparation of uniform polymer particles having a volume average particle diameter in the range from about 5 to about 100 microns. Said method and apparatus are useful in the preparation of linear as well as crosslinked polymers, such as styrene/divinylbenzene copolymers.

The polymer particles prepared using the method and apparatus of this invention are useful as calibration standards such as in blood cell counters, aerosol instruments, and pollution control equipment, in fast liquid protein chromotography and other chromatographic applications, as substrates for ion exchange resins, as seeds for the preparation of larger uniform polymer particles, as well as other uses.

BRIEF DESCRIPTION OF THE DRAWINGS

Understanding of the invention will be facilitated by referring to the accompanying drawings in which.

DETAILED DESCRIPTION OF THE INVENTION

Figure 1:
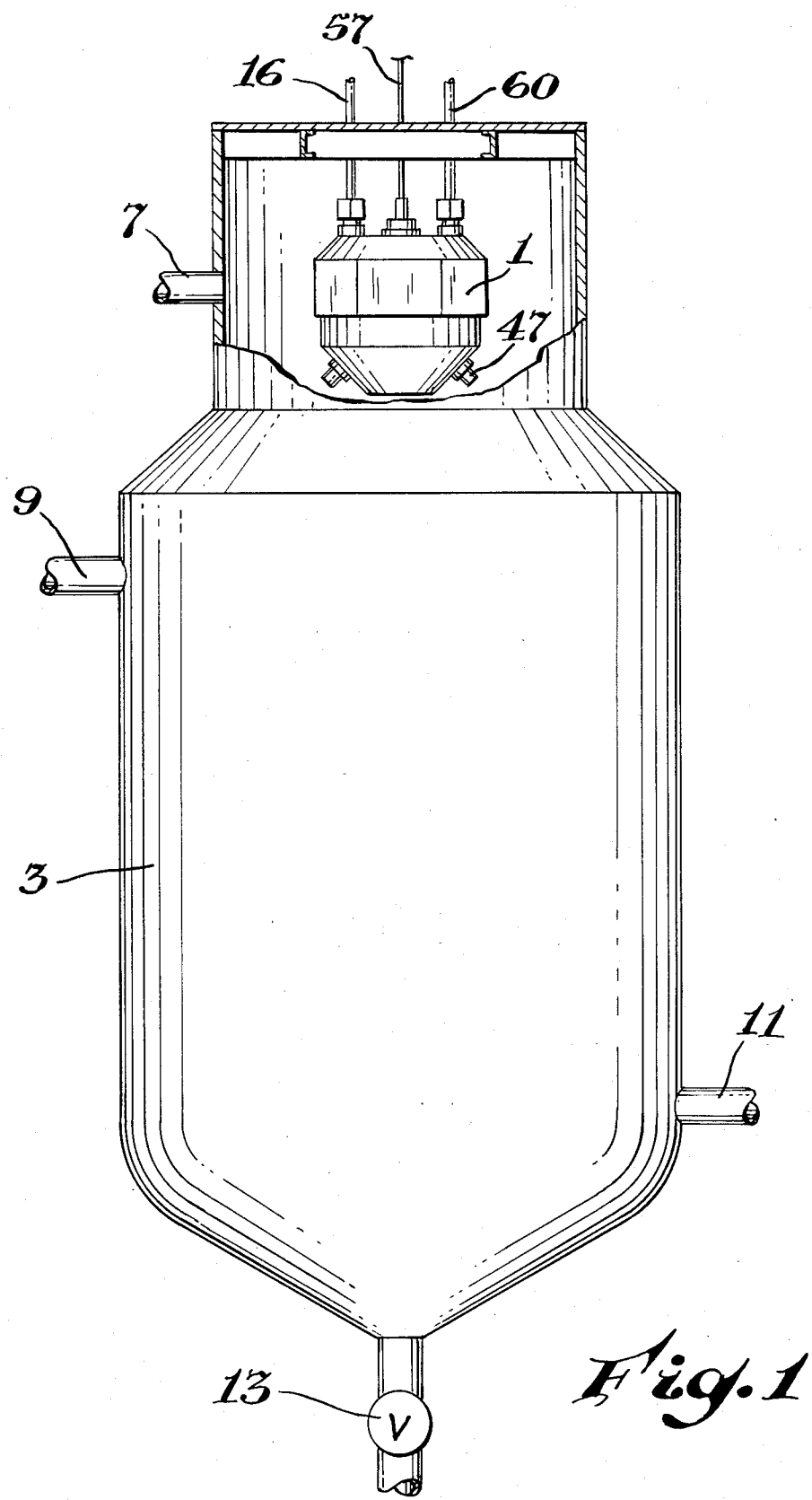
FIG. 1 is a schematic representation, partially a cross-section which illustrates an embodiment of the present invention.
Figure 3:
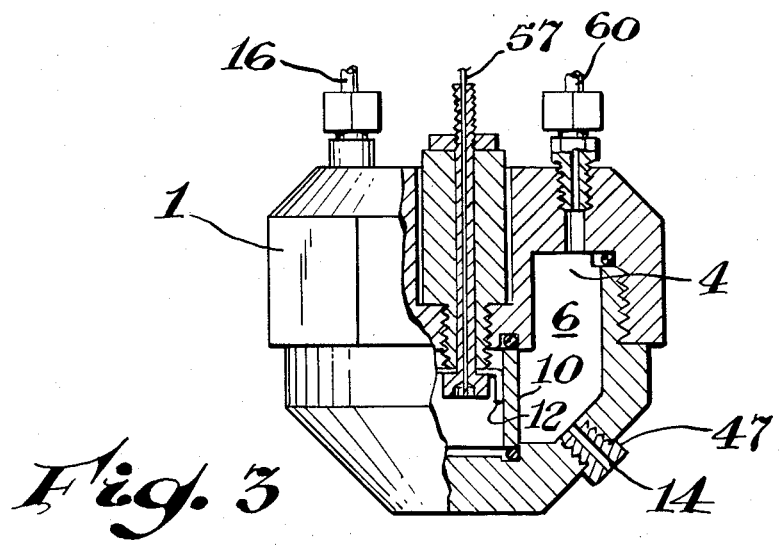
FIG. 3 is a detail of a portion of FIGS. 1 and 2.

Referring now more particularly to the drawings, FIGS. 1 and 3 depict a monomer disperser unit 1 having a monomer reservoir 6, containing a monomer phase 4 comprising a polymerizable monomer. The monomer reservoir communicates with a source of monomer (not shown) by means of monomer feed conduit 16.

The monomer disperser unit 1 contains a monomer jet-forming means such as orifice 14 which is in intimate contact with the monomer reservoir 6 and has an opening connecting the monomer reservoir with the space enclosed by column 3. A means for vibratorily exciting the monomer flow jet comprises a piezoelectric element 10 or other means such as a piston or diaphragm which is in intimate contact with the monomer phase 4 in reservoir 6. In FIG. 3, the piezoelectric element 10 is connected by electrical contact 12 to a variable frequency or oscillating electrical signal generator (not shown) through electrical connection 57 in a manner such that the piezoelectric element 10 vibrates at the frequency generated by said oscillating signal generator.

Column 3 contains, downstream from the disperser unit 1, an inlet 9 through which an initiator such as a gaseous cationic polymerization initiator enters column 3. An inlet 7 is provided upstream of the disperser unit through which an inert gas, such as nitrogen, enters column 3. Column 3 further contains a polymer outlet 13 at the end opposite that at which the disperser unit is placed and a gas outlet 11 also located at the end of the column 3 opposite that containing the disperser unit 1.

In operation, monomer phase 4 comprising a polymerizable monomer including mixtures of one or more copolymerizable monomers, or mixtures of one or more copolymerizable monomers with a nonpolymerizable material, e.g., inert porogenic or pore-forming material, prepolymer or the like, is introduced into monomer reservoir 6 via conduit 16. There can be a number of conduits 16. It is preferable to provide a monomer vent 60 such that monomer reservoir 6 can be completely filled with monomer phase 4. The monomer phase 4 is fed into reservoir 6 at a rate such that the monomer phase is forced through opening 14 of an orifice assembly 47 into the continuous gas phase contained by column 3 at a rate sufficient to form a jet having laminar flow characteristics. In this invention, the flow characteristics of the monomer jet are described by the dimensionless Reynolds number (Re) said Reynolds number being defined as the product of the density of the monomer phase ($\rho$), including the polymerization initiator and other additional materials, expressed in grams per cubic centimeter (g/cm$^3$), the mean jet velocity (v) of the monomer phase expressed in centimeters per second (cm/sec) and the diameter (d), expressed in centimeters (cm) of the opening through which the monomer is flowed divided by the viscosity ($\mu$) of the monomer phase expressed in poise (i.e., $Re = \rho v d / \mu$).

The Reynolds number of the monomer jet in this invention must be sufficiently high that the jet has laminar flow characteristics. In addition, the Reynolds number of the monomer jet must be sufficiently low that the jet does not create turbulent flow conditions which significantly impair the uniformity in droplet size. In general, monomer jets having a Reynolds number in the range from about 1 to about 2000 exhibit laminar flow characteristics yet do not create a turbulent flow which impairs the uniformity in droplet size.

Preferably, the monomer jet exhibits flow characteristics defined by a Reynolds number from about 5 to about 1,200, more preferably from about 120 to about 1,200, most preferably from about 225 to about 700.

As the thus-formed monomer jet flows into the continuous phase, the jet is vibratorily excited at a frequency which breaks the jet into droplets. In general, the monomer jet is excited at conditions such that generally uniform sized droplets are prepared. By the term "generally uniform" is meant that the droplets exhibit a particle size distribution having a coefficient of variance of less than 0.1. In the practice of this invention, droplets having such monomodal distribution are prepared by vibratorily exciting the monomer jet at constant vibrational characteristics defined by the dimensionless Strouhal number (St) from about 0.05 to about 5 wherein the Strouhal number is the product of $2\pi$, the frequency (f) of the vibration expressed in hertz (hz) and the diameter (d), expressed in cm, of the opening through which the monomer is flowed divided by the mean jet velocity (v) of the monomer phase expressed in cm/sec (i.e., $St = 2\pi f d / v$).

As depicted in FIG. 3, such vibrational excitation can be provided by the piezoelectric element 10.

The excitation of such monomer jet is preferably conducted at vibrational conditions defined by a Strouhal number from about 0.15 to about 1.5, preferably from about 0.4 to about 1.2.

The specific conditions at which the droplets are formed, i.e., the flow characteristic of the monomer jet and vibratory excitement thereof, which are most advantageously employed herein depend on a variety of factors, particularly the desired size and uniformity, i.e., particle size distribution, of the monomer droplets and the resulting spheroidal polymer beads. In general, the monomer droplets are preferably prepared having a particle size distribution such that the coefficient of variance thereof is less than about 0.07, more preferably less than about 0.05. Most preferably, the coefficient of variance of the particle size of the monomer droplets is negligible, i.e., less than about 0.01. At the formation of monomer droplets having such uniformity, the subsequent polymerization of the monomer at conditions which do not cause significant coalescence or additional dispersion will give spheroidal polymer beads having a particle size such that at least about 50 volume percent of said beads have a particle diameter from about 0.9 to about 1.1 times the volume average particle diameter of the beads. Advantageously, at least about 80, preferably at least about 90, more preferably at least about 95, volume percent of the beads exhibit such particle size, wherein particle size is measured employing conventional techniques such as described in U.S. Pat. No. 4,444,961. The Strouhal and Reynolds numbers which impart such uniformity to the monomer droplets and the subsequently prepared polymer beads will vary depending on the components of the monomer phase, including the types and amounts of monomers being employed, and the composition of the continuous suspending medium.

At such conditions, droplets of the monomer phase equal in volume to the amount of the monomer phase flowing through the opening divided by the vibrationary frequency are prepared. By properly selecting the frequency and monomer flow rates, discrete particles of a mechanistically predetermined particle size can be prepared. Therefore, the particle size uniformity of the beads can be represented using this calculated, predetermined particle size by magnifying (at least 50×) a statistically significant sample of beads (e.g., from at least 100 to about 1000 beads) and measuring the particle diameter of the magnified beads. At least about 70 percent, by number, of the beads in the statistical sample advantageously have a particle size which is from about 0.95 to about 1.05 times the predetermined size. Preferably, at least about 80, more preferably at least about 90, percent by number of the beads exhibit such particle size. Expressed alternatively, of the total amount of beads, at least 80 percent by number (and preferably on a corresponding weight basis) preferably have a particle size between about 0.95 and about 1.05, inclusive, more preferably between about 0.97 and about 1.03, inclusive, times the number average particle size of the beads comprising the 80 percent portion. More preferably, at least about 90, most preferably at least about 95, percent by number of the beads exhibit such a uniform particle size when compared to the number average particle size of the beads comprising the corresponding 90 or 95 percent portion.

Alternatively, droplets having bimodal or essentially any other particle size distribution can be prepared by varying the vibrational characteristics as defined by the Strouhal number such as by varying the frequency of vibration or by employing an orifice plate having different size passages.

An inert gas such as nitrogen, or the so-called noble gases, are flowed into column 3 through inlet 7. The rate of flow of said inert gas is at least sufficient to prevent the gaseous cationic polymerization initiator which is charged into column 3 through inlet 9 from contacting the monomer phase 4 in or near the dispersing unit 1, thereby effecting polymerization of monomer in the disperser unit 1. In addition, the rate of flow of the inert gas may be sufficiently high that it aids in the dispersion of separation of the monomer droplets as they are formed by the dispersing unit. A gaseous cationic polymerization initiator, such as boron trifluoride, is flowed into column 3 via inlet 9. The rate of flow of the gaseous cationic polymerization initiator is chosen such that sufficient of said initiator is present in column 3 to effect a rapid polymerization of the monomer droplets in column 3. The rate of flow of the gaseous cationic polymerization initiator in the inert gas is chosen together such that said initiator does not contact the monomer phase in or near the disperser unit. Moreover, the rates of flow of the cationic polymerization initiator and the inert gas, the dimensions, particularly the length of column 3, and the polymerization conditions within column 3 (i.e., temperature) are together chosen such that the residence time of the monomer droplets in column 3 is sufficiently high that the droplets are substantially completely polymerized before exiting column 3 through polymer outlet 13. If desired, this apparatus can be employed in a batch wise manner by closing polymer outlet 13 throughout the polymerization process, thereby collecting polymerized polymer particles at the bottom of column 3 until the desired number of particles is obtained. In operating this process in such a batch wise manner, the monomer droplets must be essentially completely polymerized before contacting the other polymer particles at the bottom of column 3. If the gas exiting column 3 through gas outlet 11 contains significant amounts of the gaseous cationic polymerization initiator, said gas may be recycled back into column 3 through conduit 9, if desired.

In the embodiment illustrated in FIG. 1, the disperser unit 1 is located at the top of column 3, and the dispersed droplets fall downward through the column. Alternatively, the illustrated apparatus may be inverted in order that the disperser unit is located at the bottom of column 3, and the dispersed monomer droplets are caused to flow upward through column 3 and exit at or near the top thereof. In such an "inverted" embodiment, the rate of flow of the inert gas entering the column at inlet 7 must be sufficiently high such that the monomer droplets are borne upward through column 3. Use of such an "inverted" embodiment has the advantage that the residence time of the monomer droplets in column 3 can be controlled by controlling the rate of flow of the inert gas into column 3 through inlet 7. However, it is recognized that such longer residence time in column 3 can also cause a decrease in capacity of the polymerization system.

In general, the cationic polymerization process employed in this embodiment of the invention is very rapid, i.e., essentially complete conversion of monomer to polymer in the dispersed droplets occurs within seconds after contacting thereof with the cationic polymerization initiator. The temperature employed in such cationic polymerization is in the range from about $-100°$ C. to about $100°$ C., preferably about $0°$ C. to about $50°$ C.

Figure 2:
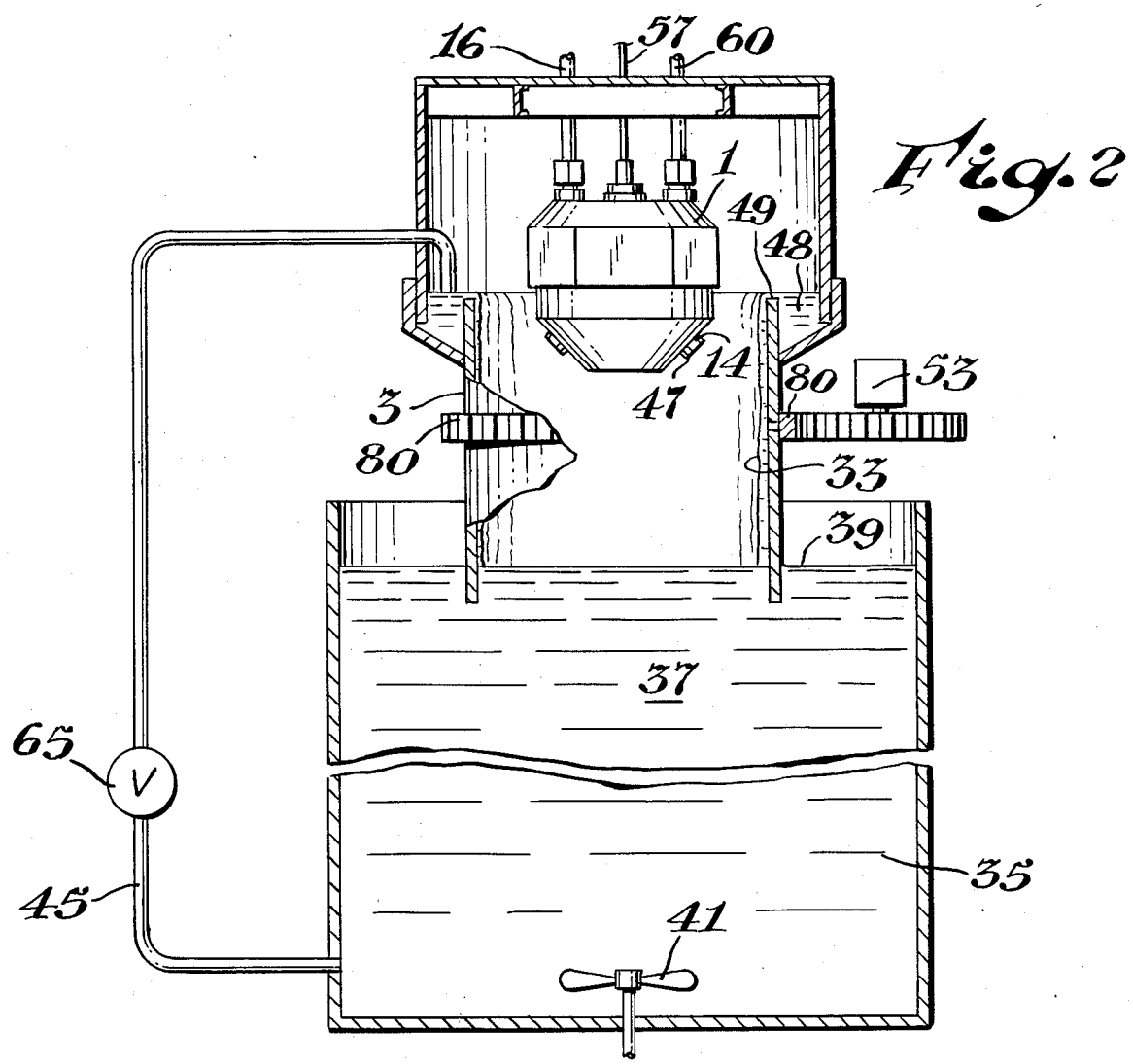
FIG. 2 is a schematic representation, partially a cross-section of another embodiment of the present invention.

In FIG. 2, another embodiment of this invention is illustrated wherein the formed monomer droplets are polymerized in suspension. In general, direct dispersion of monomer droplets of the size range between 5 and 100 microns into the continuous phase is difficult due to the poor fluidization characteristics of such small monomer droplets. However, merely permitting the dispersed monomer droplets to fall onto the surface of the continuous phase is generally inadequate to disperse said drops therein since the drops, due to their small size, can tend to float on the surface of the continuous phase and agglomerate forming monomer pools on the surface of the continuous phase. Accordingly, an embodiment of the present invention employing the suspension polymerization of the dispersed monomer droplets requires a means for introducing the monomer droplets below the surface of the continuous phase. Thus, in FIG. 2 is illustrated a disperser unit 1 having an orifice assembly 47 having openings 14 which are located within the space encompassed by a wetted wall 33 of column 3. The diameter of wetted wall 33 of column 3 is chosen such that the dispersed monomer droplets exiting from disperser openings 47 are sprayed directly onto the wall thereof. The entire interior surfaces of wetted wall column 33 is wetted with an amount of the continuous phase 37 sufficient to suspend the monomer droplets and carry them beneath the surface 39 of the continuous phase 37. Said continuous phase 37 is contacted near the top of said wetted wall 33 of column 3 via conduit 45 and applied to wetted wall 33 of column 3 under conditions such that essentially the entire interior surfaces thereof are continuously wetted with continuous phase 37. This can be accomplished using a pumping means 65. For example, continuous phase 37 leaving conduit 45 can enter a reservoir 48 which fills with continuous phase which spills over lip 49 of column 3 and wets the wall of column 3. Wetted wall 33 of column 3 communicates with suspension polymerization vessel 35 such that the bottom of wetted wall 33 of column 3 extends just above or below surface 39 of continuous phase 37. The monomer droplets exiting the disperser unit 1 from disperser opening 47 are transported down the interior walls of wetted wall 33 of column 3 into suspending medium 37 which suspending medium is agitated by means of agitation means 41 such that the monomer droplets remain dispersed in suspending medium 37. Optionally, wetted wall 33 of column 3 is rotated along its transverse axis by means of a spinning means 53 and a means such as a gear 80 in order to increase the spacing between successive monomer droplets as they contact the wetted wall column.

With regard to the various components of the present invention, orifice 14 is suitably any means comprising a passage or, more generally, a plurality of passages through which the monomer phase can be passed at conditions such that a jet or plurality of jets of the monomer phase is formed having laminar flow characteristics. Although the jet forming means can consist of one or more capillary tubes, it is more advantageous to employ a plate or similar device having one or more passages, e.g., a perforated disc, wherein each passage is advantageously generally a cylindrical or slightly frusto-conical passage of the same dimensions. See U.S. Pat. No. 4,444,961. Most typically such plate or similar device will have a single passage, with a plurality of plates being employed if a plurality of jets are desired. In general, the diameter of the passage openings can range from less than about 1.0 $\mu$m to about 50 $\mu$m wherein diameter refers to that cross-section of the passage having the smallest diameter. The diameter of each opening is primarily determined by the desired size of the monomer droplets. Typically, the desired droplet size will vary from about 5 to about 100 $\mu$m or less, more typically from about 5 to about 50 $\mu$m, most typically from about 5 to about 25 $\mu$m. While the passage diameter which will produce this size droplet is dependent on a variety of factors including the physical properties, e.g., viscosity, density and surface tension, of the monomer phase, and the conditions of the vibrational excitation, typically, passage diameters from about 1 to about 50, more typically from about 2 to about 20 $\mu$m are employed. Using passages having such diameters, the length of each passage, i.e., that distance through which the monomer phase contacts essentially the entire circumference of the passage, is advantageously less than about 0.5 times the diameter of the opening. Preferably, the length to diameter ratio (L/d) of the passages is from about 0.1 to about 10.

If the orifice plate contains a plurality of passages, such passages are spaced a sufficient distance apart from each other such that the formation mechanism required to prepare the uniformly sized monomer droplets and the stability of the resulting droplets are not significantly and deleteriously affected by the laminar jet and droplet formation of an adjacent jet. In general, interactions between the droplet formation of adjacent jets are not significant when a passage is spaced at a distance of at least about 20 times the diameter of each opening apart from the nearest passage thereto, when said distance is measured from the center of each passage. A minimum distance, center to center, of at least about 1 mm is preferred. In addition, modifications which minimize the effect of the adjacent monomer jets such as providing a protective cavity which protects each of the monomer jets until broken into droplets are often advantageously provided in the orifice plate.

Similarly, when a plurality of orifice plates are employed, the spacing and arrangement of such orifice plates are such that the operation of such formation of droplets is not significantly and deleteriously affected by the formation of droplets at an adjacent orifice plate.

Although the orifice plate can be prepared from a variety of materials including metal, glass, plastic or rubber, a perforated metal plate is preferably employed.

The vibration is suitably provided by any means which oscillates or vibrates at a frequency capable of exciting the monomer jet at vibrational characteristics such that the monomer jet is broken into droplets, preferably, droplets of a general uniform size. Although transverse excitation can be employed, the monomer jet is preferably subjected to longitudinal excitation. Generally, frequencies from about 5,000 to about 500,000, advantageously from about 20,000 to about 200,000 hertz, give the desired vibrational characteristics. In general, vibratory means such as piezoelectric, mechanical, electroacoustic, hydroacoustic or electromagnetic vibrators and magnetoresistive transducers well known in the art can be employed herein. Piezoelectric vibrators are more generally preferred.

When a suspension polymerization process is employed, the monomer phase comprises one or more polymerizable monomers which forms a discontinuous phase dispersed throughout the suspension medium upon the formation of droplets thereof. Polymerizable monomers advantageously employed in such an embodiment of this invention are polymerizable monomers or mixtures of two or more copolymerizable monomers which monomers or monomer mixtures are sufficiently insoluble in a liquid (which liquid may contain a surfactant) to form droplets upon the dispersion of the monomer therein. Monomers having only limited miscibility in water such as acrylonitrile can also be employed herein. Suspension polymerizable monomers are well known in the art and reference is made to *Polymer Processes*, edited by Calvin E. Schildknecht, published in 1956 by Interscience Publishers, Incorporated, New York, Chapter III, "Polymerization in Suspension" by E. Trommsdoff and C. E. Schildknecht, pp. 69–109 for purposes of illustration. In Table II on pp. 78–81 of Schildknecht are listed diverse kinds of monomers which can be employed in the practice of this invention. Of such suspension polymerizable monomers, of particular interest herein are the water-insoluble monomers including the monovinylidene aromatics such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatics such as divinylbenzene, divinyltoluene, divinyl xylene, divinyl naphthalene, trivinylbenzene, divinyl diphenyl ether, divinyl diphenyl sulfone and the like; halo olefins, particularly the vinyl halides such as vinyl chloride; esters of $\alpha,\beta$-ethylenically unsaturated carboxylic acids, particularly acrylic or methacrylic acid, such as methyl methacrylate and ethyl acrylate; vinyl acetate and mixtures of one or more of said monomers. Of said monomers, the monovinylidene aromatics, particularly styrene or a mixture of styrene with a monoalkyl substituted styrene; the polyvinylidene aromatics, particularly divinylbenzene; esters of $\alpha,\beta$-ethylenically unsaturated carboxylic acid, particularly methyl methacrylate or combinations thereof, particularly a mixture of styrene and divinylbenzene or styrene, divinylbenzene and methyl methacrylate are preferably employed herein.

Also included within the polymerizable monomers useful herein are those monomers which form a solution with a liquid, generally water, wherein the resulting solution is sufficiently insoluble in one or more other liquids, generally a water-immiscible oil or the like, such that the monomer solution forms droplets upon its dispersion in said other liquid. Representative of such monomers are water-soluble monomers which can be polymerized using conventional water-in-oil suspension (i.e., inverse suspension) polymerization techniques such as described by U.S. Pat. No. 2,982,749 which is hereby incorporated by reference, including ethylenically unsaturated carboxamides such as acrylamide, methacrylamide, fumaramide and ethacrylamide; aminoalkyl esters of unsaturated carboxylic acids and anhydrides; ethylenically unsaturated carboxylic acids, e.g., acrylic or methacrylic acid, and the like. Preferred of such monomers for use herein are the ethylenically unsaturated carboxamides, particularly acrylamide, and the ethylenically unsaturated carboxylic acids, particularly acrylic or methacrylic acid. The monomer phase of such water-soluble monomers will generally contain sufficient amounts of water to solubilize the monomer. In such cases, although the amounts of the monomer and water most advantageously employed will vary depending on many factors including the specific polymer and desired end use application, the monomer generally constitutes less than about 90 weight percent of the monomer phase. Preferably, these water-soluble monomers constitute from about 5 to about 80, more preferably from about 30 to about 55, weight percent of the monomer phase.

In such embodiments employing a suspension polymerization process, the monomers can be polymerized using free radical initiation such as UV radiation or heat, however, in general, the monomer or monomer mixture contains a chemical free radical initiator. Free radical polymerization initiators conventionally employed heretofore in the preparation of polymers from the hereinbefore described monomers are advantageously employed. For example, a monomer soluble free radical initiator such as a monomer soluble peroxygen, e.g., benzoyl peroxide, or azobisisobutyronitrile is advantageously employed in conjunction with the water-insoluble monomers conventionally prepared using suspension polymerization techniques. Similarly, a water-soluble free radical initiator such as the persulfates, hydrogen peroxides or hydroperoxides is advantageously employed in conjunction with the water-soluble monomers such as acrylamide. Conventional polymerization aids, e.g., chain transfer agents, chelating agents and the like, can also be included within the monomer phase. Pore-forming materials, i.e., those materials which impart a porous structure to the resulting polymer beads such as an organic material which forms a solution with the monomers and which does not dissolve the resulting polymer (e.g., aliphatic hydrocarbons such as hexane and isooctane) can also be included in the monomer phase.

The continuous liquid phase contained in suspenion polymer vessel 35 is a suspension medium comprising (1) a suspending liquid immiscible with the polymerizable monomer or monomer phase and the polymer prepared therefrom and (2) a stabilizing amount of a suspending agent.

The suspending liquid is suitably any inert liquid which is immiscible with the polymerizable monomer or monomer phase in which the liquid monomer or monomer phase is capable of being dispersed as droplets. By the term "immiscible" is meant that less than about 10 weight percent of the polymerizable monomer or monomer phase is miscible (or soluble) in the suspending liquid, i.e., the suspending liquid does not solvate more than about 10 weight percent of the monomer phase or polymerizable monomer. Preferably, less than about 1, more preferably less than about 0.1, weight percent of the monomer or monomer phase is miscible in the suspending liquid. In the normal practice of this invention, the suspending liquid will contain a suspending aid. Suitable suspending aids are those materials which enable the formation of the monomer phase into spheroidal droplets of a desired size and which hinder the coalescence or dispersion of the thus-formed droplets before or during polymerization of the monomer.

Typically, the suspending liquid advantageously employed with the hereinbefore described suspension polymerizable monomers is water or mixtures of water with one or more water-miscible organic liquids such as the lower alkyl alcohols such as methanol or butanol. Preferably, water is employed as the suspending liquid. Alternatively, when the monomer phase comprises a water-soluble monomer, a water-immiscible oil conventionally employed in the preparation of a water-in-oil suspension such as a halogenated hydrocarbon, e.g., methylene chloride, or a liquid hydrocarbon, preferably having from about 4 to about 15 carbon atoms, including aromatic and aliphatic hydrocarbons or mixtures thereof such as heptane, benzene, xylene, cyclohexane, toluene, mineral oils and liquid paraffins, e.g., kerosene and naptha are advantageously employed as the suspending liquid. In such case, the hydrocarbons are especially preferred.

Suspending agents most advantageously employed herein are dependent on the type and amount of monomer employed and the suspending medium. Suspending agents employed heretofore in conventional suspension polymerizations are advantageously employed herein. Representative of such suspending agents are gelatin, polyvinyl alcohol, starch, polyacrylic acids, including salts thereof such as sodium oleate, water-insoluble inorganic compounds such as magnesium silicate, cellulose ethers including the methylcelluloses, e.g., carboxymethylmethylcellulose and hydroxyethylcellulose, and the like.

In the practice of the present invention, the suspending medium contains a stabilizing amount of the suspending aid. By the term "a stabilizing amount" is meant an amount sufficient to maintain stable monomer droplets in the suspending liquid following droplet formation until subsequent polymerization while preventing excessive coalescence or additional dispersion, i.e., the breaking of a droplet into a smaller size than the size of the originally formed droplet. Such amount of suspending aid will vary depending on the types and relative amounts of the monomer or monomers and the suspension medium and the specific suspending aid. In general, in the preparation of uniformly sized monomer droplets from the water-insoluble monomers, the suspending medium contains from about 0.05 to about 5, advantageously from about 0.075 to about 0.75, percent by weight of the suspending agent based on the total weight of the suspending liquid. Alternatively, the amount of suspending agent employed in the preparation of droplets of the more water-soluble polymers is typically from about 0.1 to about 10, advantageously from about 0.15 to about 1.5, weight percent based on the weight of the suspending liquid.

The polymerization reaction vessel is advantageously agitated to prevent significant coalescence or additional dispersion of the monomer droplets during the polymerization thereof. In general, the conditions of agitation are selected such that (a) the monomer droplets are not significantly resized by the agitation, (b) the monomer droplets do not significantly coalesce in the reaction vessel, (c) no significant temperature gradients develop in the suspension and (d) pools of monomer, which may polymerize to form large masses of polymer, are substantially prevented from forming in the reaction vessel. In general, the foregoing conditions are advantageously met using an agitator (paddle) such as described in Bates et al., "Impeller Characteristics and Power," *Mixing*, Vol. I, V. W. Uhl and J. B. Gray, Eds, published by Academic Press, New York (1966), pp. 116–118. Preferably, the agitator is of the anchor or gate types, as described on pp. 116–118 of Bates et al., or is of the "loop" or "egg beater" types, which are modifications of the anchor type agitator described in Bates et al. wherein a horizontal cross member is affixed to bars of the agitator at or near the ends of said bars. More preferably, the agitator bars extend up through the surface of the suspension, thereby preventing the formation of monomer pools on the surface of the suspension.

Upon completion of polymerization, the resulting suspension having beads comprising an aqueous solution of a water-soluble polymer, e.g., carboxamide polymer, dispersed throughout a continuous oil phase is a fluid liquid which is easily pumped or poured and which is readily employed by adding it to an aqueous liquid which inverts the emulsion to an aqueous solution of the polymer. In general, a water-soluble surface active agent such as an alkali metal, ammonium or amine soap of a fatty acid such as lauric, oleic or a comparable acid is advantageously employed. Further examples of such inverting surfactants and methods for their use are disclosed in U.S. Pat. No. 3,624,019 which is hereby incorporated by reference.

Alternatively, upon the completion of the polymerization, the resulting polymer beads which comprise a normally solid polymer are advantageously recovered by conventional dewatering techniques such as filtration. The recovered beads can then be further processed. For example, upon recovery, the spheroidal polymer beads of a monovinylidene aromatic and a polyvinylidene aromatic can be converted to ion exchange resins using techniques well known in the art for converting crosslinked, aromatic polymers to such resins.

The uniform polymer beads may be functionalized to form ion exchange resins by attaching thereto active ion exchange sites using conventional processes. See, for example, U.S. Pat. No. 4,444,961, which is incorporated herein by reference.

Alternatively, upon recovery, the spheroidal beads of various polymers, e.g., polystyrene, can be prepared as an expandable material. Although the blowing agent required to make such polymers expandable can be incorporated within the monomer phase prior to droplet formation, the beads are advantageously prepared without a blowing agent and the blowing agent subsequently incorporated therein. Conventional techniques well-known in the art and illustrated by the disclosure of U.S. Pat. Nos. 2,681,321; 2,744,291; 2,779,062; 2,888,410 and 3,468,820 are advantageously employed in the present invention. By such methods, the beads are suspended in water in a pressure vessel and the blowing agent, e.g., fluorocarbon gas, is introduced to the vessel. Using pressure and elevated temperatures, e.g., 80°–100° C., the beads absorb the gas.

The normally solid polymeric beads can also be employed in the preparation of seeded beads having a uniform particle size. In preparing said seeded beads, polymeric seed beads having uniform size, advantageously having a particle size from about 5 to about 100 $\mu$m, are prepared by the method of this invention, i.e., the seed beads are prepared at the desired size by breaking a monomer jet by vibratorily exciting the jet and subsequently polymerizing the resulting monomer droplets. Subsequent thereto, a polymerizable monomer is imbibed within the thus prepared seed bead and the imbibed monomer is then polymerized to form the uniform size seeded beads. If desired, the thus prepared seeded beads can subsequently be chemically modified such as by the attachment of active ion exchange groups by the techniques hereinbefore exemplified to form ion exchange resins. In the preparation of the seeded beads useful in preparing ion exchange resins, the seed bead advantageously comprises at least about 0.15, preferably at least about 0.2, and advantageously less than about 2, preferably less than about 1, weight percent of a polyethylenically unsaturated crosslinking agent, e.g., polyvinylidene aromatic, based on the total weight of monomers employed in preparing the seed bead. Of the monomer imbibed by the seed bead, the amount of polyethylenically unsaturated crosslinking agent employed can vary widely, with a polyethylenic monomer advantageously constituting from about 0.2 to about 8, preferably from about 2 to about 6, weight percent of the imbibed monomer. In general, the seed bead will constitute from about 1 to about 50, preferably about 5 to about 45, more preferably from about 10 to about 30, weight percent of the total dry weight of the seeded bead with the remainder of the seeded bead being composed of the monomer imbibed and subsequently polymerized in the seed bead.

What is claimed is:

1. A method for preparing small spheroidal polymer beads having a volume average particle diameter of about 5 $\mu$m to about 100 $\mu$m, said method comprising forming a monomer jet having laminar flow characteristics by flowing a vibratorily excited liquid monomer phase comprising a polymerizable monomer through an opening into a continuous gas phase under conditions sufficient to form a plurality of monomer droplets comprising the polymerizable monomer; said monomer droplets ranging in size from about 5 μm to about 100 μm, subsequently polymerizing said monomer droplets under conditions which do not cause significant coalescence or additional dispersion thereof by (a) polymerizing said droplets which are dispersed in said gas phase, or (b) dispersing said droplets into a continuous phase comprising a liquid immiscible with the polymerizable monomer phase and containing a stabilizing amount of suspending agent and subsequently polymerizing said droplets in suspension under conditions which do not cause significant coalescence or additional dispersion thereof.

2. A method of claim 1 wherein the beads so prepared have a particle size such that about 90 volume percent thereof possess a particle diameter from about 0.95 to about 1.05 times the volume average particle diameter of the particles.

3. A method of claim 1 wherein polymerization is effected in said gas phase by employing a cationic catalyst.

4. A method of claim 1 wherein the monomer droplets exhibit a particle size distribution having a coefficient of variance of less than 0.1.

5. A method of claim 1 wherein the flow characteristics of the monomer jet is defined by a Reynold's number from about 1 to about 2,000 and the vibratory excitation of the monomer jet is defined by a Strouhal number of from about 0.05 to about 5.

6. A method of claim 5 wherein the monomer jet is formed by flowing the monomer phase through a passage having an opening with a diameter from about 1 μm to about 50 μm.

7. A method of claim 1 wherein said polymerizable monomer is a suspension polymerizable, water-insoluble monomer.

8. A method of claim 7 wherein said water-insoluble monomer is a monovinylidene aromatic, a polyvinylidene aromatic, a halo-olefin, an ester of an α-β-ethylenically unsaturated carboxylic acid, or a mixture of two or more of said monomers.

9. A method of claim 6 wherein polymerization is affected in said gas phase by employing a cationic catalyst.

10. A method of claim 1 wherein the polymer beads so prepared have a volume average particle diameter of about 5 μm to about 50 μm.

11. A method of claim 1 wherein the polymer beads so prepared have a volume average particle diameter of about 5 μm to about 25 μm.

12. A method of claim 9 wherein the polymer beads so prepared have a volume average particle diameter of about 5 μm to about 50 μm.

13. A method of claim 1 wherein said monomer droplet falls downward through said gas phase.

14. A method of claim 1 wherein polymerization is performed in said gas phase.

* * * * *